United States Patent [19]
Wächter et al.

[11] 3,782,198
[45] Jan. 1, 1974

[54] DEVICE FOR MEASURING OR DETECTING GAS

[75] Inventors: Karl-August Wächter, Lubeck; Horst Rabenecker, Am Muhlenteich, both of Germany

[73] Assignee: Dragerwerk Aktiengesellschaft, Lubeck, Germany

[22] Filed: Aug. 24, 1972

[21] Appl. No.: 283,507

[30] Foreign Application Priority Data
Aug. 30, 1971 Germany............ P 21 43 282.6

[52] U.S. Cl............................................ 73/421.5 R
[51] Int. Cl. ........................................... G01n 1/24
[58] Field of Search ............... 73/23, 28, 269, 270, 73/271, 421.5 R, 422 TC

[56] References Cited
UNITED STATES PATENTS

| | | | |
|---|---|---|---|
| 2,484,202 | 10/1949 | Wintermute............................ | 73/28 |
| 2,489,654 | 11/1949 | Main-Smith et al. ...... | 73/421.5 R X |
| 3,238,783 | 3/1966 | Wright............................. | 73/421.5 R |
| 3,422,681 | 1/1969 | Sanders......................... | 73/421.5 R |

Primary Examiner—Charles A. Ruehl
Attorney—John J. McGlew et al.

[57] ABSTRACT

A device for measuring or detecting gas comprises a mounting base having a sample connection for connecting an opened vessel thereto which is adapted to contain a sample to be tested. A container carries a collapsible bellows therein and the bellows has one wall which is common to a container wall. A reversing valve is connected to the container and also to a pump to selectively connect the pump to the container or connect the container to atmosphere. The container includes a check valve for permitting discharge of gas therefrom and a switch is actuated by movement of the bellows to switch the reversing valve in accordance with whether it is desired to have the pump or the atmosphere connected into the container. An under pressure measuring device is connected into the container and is also connected to the reversing valve to switch the valve in accordance with the pressure sensed in the bellows or the container. This control works in conjunction with the control which operates upon expansion and contraction of the bellows to operate the reversing valve.

12 Claims, 3 Drawing Figures

DEVICE FOR MEASURING OR DETECTING GAS

BACKGROUND OF THE INVENTION

1. Field of the Invention

This invention relates in general, to testing devices, and in particular, to a new and useful device for detecting foreign gases or suspended matter in air, in which the air is drawn into a sampling vessel.

2. Description of the Prior Art

Testing devices which are employed for detecting foreign gases or suspended matter in air are known which include a collapsible bellows which is operated to expand and contract in order to convey the air into the sampling vessel. In the usual arrangements, the bellows is urged to an expanded position by a biasing spring and the limit of its expansion can be regulated by the length of locking bands. The bellows is provided with only one outlet valve and the air resistance of the suction port is greater than the resistance of the outlet valve. With this known device, a defined amount of air is conveyed during each working stroke through the reagent vessel at a rate which varies with time. The reagent vessel is generally in the form of a test tube which is opened at one end and connected to the bellows at its opposite end. The suction rate depends on the resistance of the test tube and on the spring force of the driving spring for operating the bellows. The characteristics of said devices makes it necessary in most cases to compress the bellows repeatedly by hand in order to convey a certain amount of air. The operation requirement causes operator fatigue and also produces inaccuracies due to the difference in the time intervals between the individual working strokes. One attempt to remedy this disadvantage is the provision of a driving mechanism which includes a pressure plate which is connected to the bellows part and is moved backwardly and forwardly by driving an electric motor like a clockwork mechanism. Its velocity is greater than the velocity of the moving bellows part during the working stroke of the bellows pump. The device is so controlled that the pressure element is moved backwardly and forwardly over the full moving stroke and it stands still in one end position during the further course of the working stroke of the bellows pump. A spring loaded gas detecting pump is used as an air conveyor. The suction side of the bellows pump is connected to a pressure measuring element such as a pressure cell which shuts off the drive with an under pressure on the suction side of the pump and it starts the drive at normal pressure on the suction side of the pump. In still another embodiment, a pressure measuring element such as a pressure cell is connected to the pressure side of the bellows pump and it shuts off the drive at an over pressure on the pump outlet side and starts the drive as a normal pressure on the pump outlet side. In addition, a break contact controlled by a pressure cell arranged on the suction side of the bellows pump can be connected into the circuit of an electric drive which is opened at an under pressure on the suction side of the pump and closed at a normal pressure on the suction side. The disadvantage of these known devices is that even though the manual operations are eliminated, it requires a relatively powerful drive.

SUMMARY OF THE INVENTION

This invention provides a testing device for detecting gas or dust in a gas such as air and which is equipped with an air conveyor which is not operated by hand but which is simple in design, and uses a relatively low driving force for conveying the air which is to be tested. With the inventive arrangement, the air to be tested is sucked by means of an air conveyor through a reagent or measuring vessel such as a test tube and the air conveyor includes a spring loaded bellows. The bellows is arranged inside a container and one end face of the bellows is formed by a common wall of the container. One of the compartments, formed either by the bellows or the chamber and the exterior of the bellows, is connected to the measuring vessel for the purpose of drawing air therethrough and the other compartment is connected to a reversing valve which is capable of connecting the compartment either to the atmosphere or to a pump. The biasing force acting on the bellows acts against either the over or the under pressure which is generated with the pump. The bellows pump can be driven by generating intermittently an over pressure or an under pressure on the respective sides of the bellows which is opposite to the moving test air current. In one embodiment, the pump is designed as a pressure pump and in another the pump is a suction pump and the biasing means, associated with the bellows pump inside the container, is located to affect a corresponding movement of the bellows in accordance with the pump chosen. The device of the invention has the advantage that its drive is very simple in design and need not be operated by hand. The device is lightweight and compact and can be used particularly for tests over a long period of time for several samples have to be taken successively at greatly varying time intervals.

A simple embodiment of the invention includes a bellows with a stop or actuating member which acts on a control device such as a switch which is connected to the reversing valve. This actuation takes place preferably at each end position and it is preferably adjustable. For an automatic control of the device, an under pressure measuring device is arranged in the chamber or in the bellows pump in order to provide for an operation of the reversing valve when there is pressure equilibrium between the interior of the bellows and the atmosphere. The bellows advantageously are a known spring loaded type bellows of a gas detecting pump.

Accordingly, it is an object of the invention to provide an improved device for measuring or detecting gas or dust which is conveyed in a gas such as air and which is reliably and regularly driven to provide for periodic intake of the gases to be measured.

A further object of the invention is to provide a gas detecting device which includes a collapsible and expansible bellows arranged within a chamber in a position such that its expansion and contraction results in a change in the container which is communicated to the test vessel for drawing in a supply of air to be tested at regular intervals and which includes a pump connected to the chamber for regulating the pressure of the container in accordance with the movement of the bellows.

A further object of the invention is to provide a device for measuring a detecting gas, dust, etc, in a gas sample which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

GENERAL DESCRIPTION OF THE PREFERRED EMBODIMENTS

Figure 1:
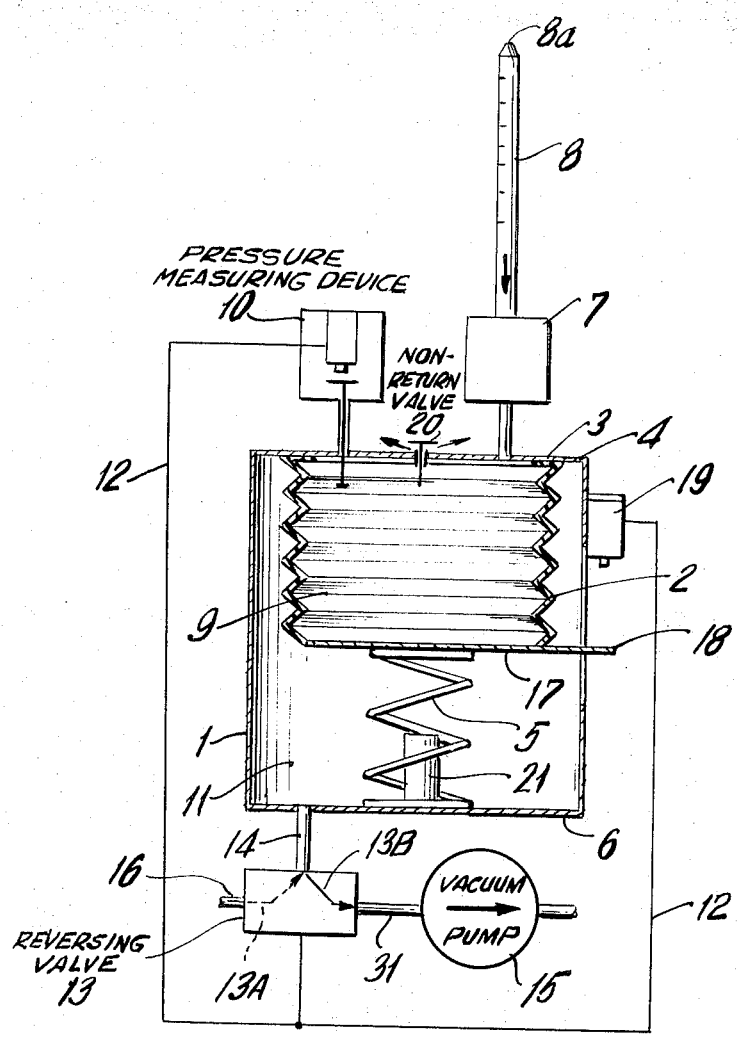
FIG. 1 is a schematic transverse sectional view of a testing device constructed in accordance with the invention.

Referring to the drawings, in particular, the invention embodied therein in FIG. 1, comprises a device for measuring or detecting the gases, dust, or foreign substances in a gas such as air which includes a bellows 2 arranged within a container 1 and which includes an end face 3 which forms a common wall portion of the end face 4 of the container. Biasing means in the form of a spring 5 bears against an exterior opposite outer wall 17 of the bellows and is supported on an end face 6 of the container 1.

In accordance with the invention, a mounting base or connection fitting 7 is connected to the container 1 at the location of the common wall portion 3 so that it communicates with the interior of the bellows 2. The mounting base 7 includes a mounting connection for connecting a gas sample container such as a test tube 8 to the container 1. In this embodiment, the interior of the test tube 8 is therefore in communication with an interior space 9 within the bellows 2.

For automatic operation of the device, an under pressure measuring device 10 is connected to the end face 3 of the container 1 and it is connected in an electrical control circuit 12 to reversing means (not shown) of a reversing valve 13. The reversing valve 13 is connected through a connecting conduit 14 to the interior of the container 1; that is, to the chamber 11 which surrounds the bellows 2 within the container. In addition, the reversing valve 13 is also connected through a conduit 31 to a pump 15 which, in this instance, comprises a vacuum pump. The reversing valve 13 is designed so that it opens the connection from the conduit 14 through the conduit 31 and the vacuum pump 15 to the container 1 as indicated by the arrow 13B in solid lines and it closes this connection when it moves to the position indicated by the arrow 13A and communicates the interior of the chamber 1 through the conduit 14 to a discharge conduit 16 which may for example lead to atmosphere.

The bellows 2 includes a moving end face 17 having a stop or actuating arm 18 which acts in one end position of the bellows on a control device 19 which is in the form of a switch which is connected into the electrical circuit 12 and to the reversing valve 13. This means that when the force of the spring 5 acts on the bellows to collapse it inwardly, the actuating member will actuate the switch 19 to close the discharge 16 and to reconnect the vacuum pump 15.

A non-return valve 20 is secured to the end face 3 and opens the bellows space 9 to the exterior when the bellows is moving in a collapsible direction. A stop 21 arranged on the opposite end face 6 of the container limits the bottom position of the bellows 2 in the expanded condition.

When the device is started, for example, from the represented position of the bellows 2 in FIG. 1, an under pressure is generated by the vacuum pump 15 in the compartment 11 so that the bellows expands to take in gas through the test tube 8 through the opened top 8a thereof. When the end face 17 of the bellows has reached its bottom position and rests against the stop 21 there is at first still an under pressure in the compartment 9 due to the flow resistance of the test tube 8. Only when pressure equilibrium has been established between the compartment 9 and the atmosphere and no test air is being sucked in does the electrical pressure switch actuate the reversing valve 13. Air can now flow through the opening 16 into the compartment 11. Spring 5 acts then to compress the bellows 2 so that the air contained therein is forced to the outside through the non-return valve 20. When the bellows 2 has reached its other end position, the electrical switch 19 is engaged by the actuating member 18 to cause the reversing valve and the circuit 12 to be operated to return again to its original position.

In the embodiment shown in FIG. 1, the rate which the gas to be tested is sucked through the test tube is determined by the suction rate of the suction pump 15, the tension of the spring 5 and the resistance of the test tube 8 as well as other resistance which prevails throughout the operating elements of the device.

Figure 2:
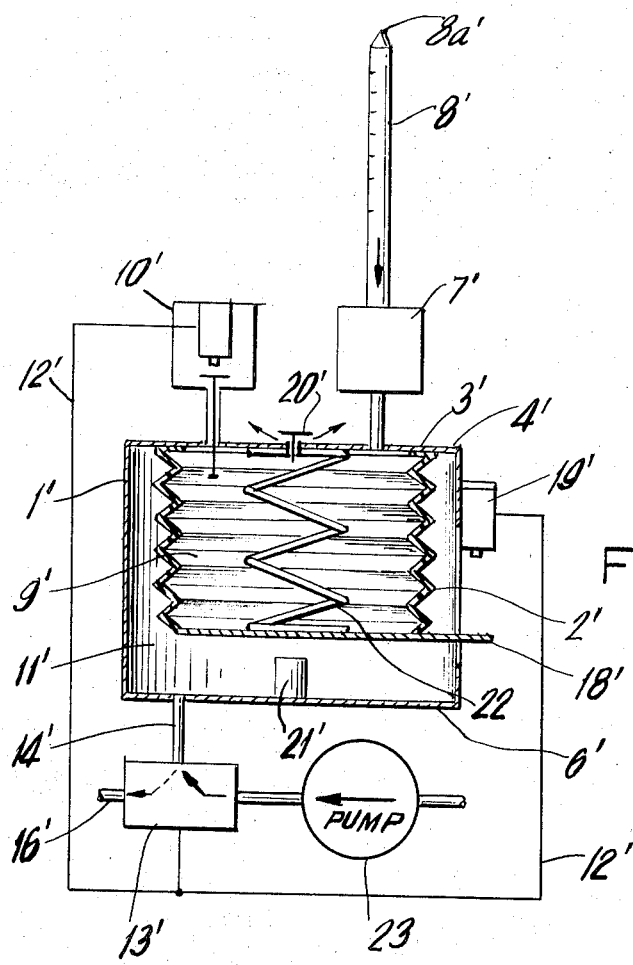
FIG. 2 is a view similar to FIG. 1 of another embodiment of the invention.

In FIG. 2, there is indicated another embodiment of the device in which similar parts are similarly designated but with primes. This embodiment differs from the previous embodiment first of all in the provision of a compression spring 22 which is arranged within the bellows 2' and also the pump 23 comprises a pressure pump instead of a vacuum pump. When the device of FIG. 2 is started, again from the position represented in the drawing, the pressure pump 23 generates an over pressure in the compartment space 11' so that the bellows 2' is compressed against the action of the compression spring 22 and the air contained in the bellows escapes through the non-returned valve 20'. The compression continues until the actuating member 18' actuates the electrical switch 19' to cause the reversing valve 13' to be switched to its other end position. The pressure in the compartment 11' then drops to the ambient pressure due to conduit 16''. The compression spring 22 then urges the bellows 2' in the direction of its other end position and an under pressure is produced in the compartment 9' of the bellows so that air or gas to be tested is sucked through a test tube 8'. When the bellows 2' has reached its full expansion and rests against the stop 21', there is at first still an under pressure in the compartment 9' due to the flow resistance of the test tube 8'. Only when pressure equilibrium has been established between the compartment 9' and the atmosphere and no test air is sucked in does the electric pressure switch 10' switch the reversing valve 13 back into its original position. The process is again repeated.

In the embodiment of FIG. 2, the suction rate is determined by the tension of the spring 22 and the resistance of the test tube 8', provided the pressure equalization between the compartment 11' and the surrounding air can be effected rapidly enough.

Figure 3:
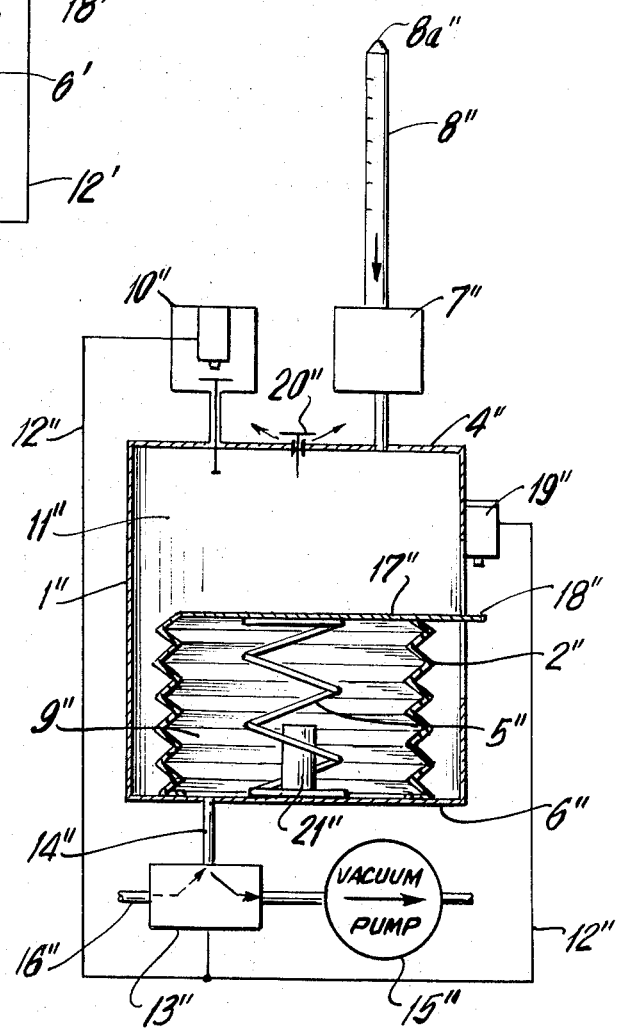
FIG. 3 is a view similar to FIG. 1 of still another embodiment of the invention.

In FIG. 3, there is indicated another embodiment in which similar parts are designated with double primes. The construction of FIG. 3 differs from the construction of FIG. 1 principally in respect to the connection of the bellows 2'' to the end face 6'' of the chamber rather than the opposite end face. With this arrangement, the compression spring 5'' is arranged inside the compartment 9'' of the bellows 2''. The under pressure in the compartment 9'' is produced by means of the vacuum pump 15''.

The method of operation of the device shown in FIG. 3 is substantially the same as that of FIG. 1. When the device is started, the position represented in FIG. 3, an under pressure is produced in the compartment 9'' of the bellows 2'' by means of the vacuum pump 15'', so that the upper end face 17'' of the bellows moves downwardly. An under pressure is thus produced in the compartment 11'' so that the gas to be tested is sucked in through the test tube 8''. When the bellows 2'' is compressed there is at first still an under pressure in the compartment 11'' due to the flow resistance of the test tube 8''. With pressure equalization between the compartment 11'' and the surrounding air, no air is sucked in anymore and the reversing valve 13'' is switched by the measuring device 10'' so that the connection between the vacuum pump 15'' and the compartment 9'' is closed and the connection between the compartment 9'' in the opening 16'' is opened. Outside air can now enter the compartment 9'' under pressure equalization flow. The bellows 2'' expands under the action of the compression spring 5'' and forces the gas contained in the compartment 11'' through the non-return valve 20'' to the outside. When the end face 17'' reaches its upper end position, the reversing valve 13'' is returned again to its original position by the control device 19''.

While a specific embodiment of the invention has been shown and described in detail to illustrate the application of the principles of the invention, it will be understood that the invention may be embodied otherwise without departing from such principles.

What is claimed is:

1. A device for measuring or detecting gases, dust, etc., in a carrying gas such as air, comprising a mounting base having a sample connection for connection to an opened vessel which is adapted to contain a sample of the gas to be tested, a closed container connected to said mounting base for subjecting the sample connection to the pressure therein for periodically drawing a sample to be tested through the open vessel, a collapsible and expansible bellows in said container, reversing valve means having a connection to said container and an atmospheric discharge and having a pump connection and with a valve part movable to selectively open the connection of said container to said atmospheric discharge and to said pump connection, a pump connected to said pump connection of said reversing valve means, a check valve connected to said container permitting discharge of gas therefrom upon achieving a predetermined pressure in said container, and switch means connected to said bellows and to said reversing valve means for operating said valve in accordance with pressure conditions in said container and movement of said bellows to change said valve from a connection to said atmospheric discharge and a connection to said pump.

2. A device, according to claim 1, wherein said pump comprises a pressure pump.

3. A device according to claim 1, wherein said pump comprises a suction pump.

4. A device according to claim 1, wherein said switch means includes a switch electrically connected to said bellows, said bellows having an actuating arm movable therewith and engageable with said switch to actuate said switch at a predetermined position of said bellows.

5. A device according to claim 1, wherein said switch means includes means for sensing the pressure in said bellows or container connected to said reversing valve and being effective upon a change of pressure by the predetermined amount to actuate said reversing valve.

6. A device according to claim 1, wherein said bellows comprises a spring loaded bellows.

7. A device according to claim 1, including spring means biasing said bellows to a collapsed condition, said pump comprising a vacuum pump, the connection of said mounting base to said container being to the interior of said bellows in said container, said vacuum pump being connected to said container in the space surrounding the bellows within said container.

8. A device according to claim 7, wherein said switch means includes a switch arranged in the path of movement of said bellows and being actuatable thereby to control said reversing valve, said check valve being connected to the interior of said bellows within said compartment, said switch means also including pressure indicating means connected to the interior of said bellows within said compartment and to said reversing valve for switching said reversing valve when pressure conditions within and without said compartment are substantially equalized.

9. A device according to claim 1, including spring biasing means arranged within said bellows biasing said bellows to an expanded condition, said pump comprising a pressure pump connected through said reversing valve to the space in said container surrounding said bellows, said mounting base being connected to said container through the space within said bellows.

10. A device according to claim 1, wherein said bellows and said container have a common end wall.

11. A device according to claim 10, wherein the connection of said reversing valve to said container extends through said common end wall and into the interior of said bellows.

12. A device according to claim 10, wherein said connection of said mounting base of said container extends through said common wall into the interior of said bellows.

* * * * *